(12) United States Patent
Kress et al.

(10) Patent No.: US 6,224,301 B1
(45) Date of Patent: May 1, 2001

(54) TOOL FOR FINE MACHINING BORING SURFACES

(75) Inventors: Dieter Kress, Aalen; Friedrich Häberle, Lauchheim, both of (DE)

(73) Assignee: Mapal Fabrik für Präzisionswerkzeuge, Dr. Kress KG (DE)

( * ) Notice: Subject to any disclaimer, the term of this patent is extended or adjusted under 35 U.S.C. 154(b) by 0 days.

(21) Appl. No.: 09/319,676

(22) PCT Filed: Dec. 23, 1997

(86) PCT No.: PCT/EP97/07270

§ 371 Date: Jun. 9, 1999

§ 102(e) Date: Jun. 9, 1999

(87) PCT Pub. No.: WO98/28099

PCT Pub. Date: Jul. 2, 1998

(30) Foreign Application Priority Data

Dec. 24, 1996 (DE) .............................. 196 54 421

(51) Int. Cl.[7] ...................................... B23B 51/00

(52) U.S. Cl. ..................... 408/188; 407/47; 407/113; 408/231; 408/713

(58) Field of Search ............................ 407/47, 49, 113; 408/187, 188, 231, 713

(56) References Cited

U.S. PATENT DOCUMENTS

| 3,987,524 | | 10/1976 | Hollfelder et al. . |
| 4,264,245 | * | 4/1981 | Lindsay ................... 407/49 |
| 5,211,516 | * | 5/1993 | Kress et al. ............. 408/231 |
| 5,221,162 | * | 6/1993 | Okawa ................... 407/113 |
| 5,904,452 | * | 5/1999 | Kress ...................... 408/713 |
| 5,967,706 | * | 10/1999 | Hughes, Jr. ............ 407/49 |

FOREIGN PATENT DOCUMENTS

| 4034345 | | 8/1991 | (DE) . |
| 21462716 | * | 4/1985 | (GB) ..................... 407/113 |
| 88/08767 | | 11/1988 | (WO) . |

* cited by examiner

Primary Examiner—A. L. Wellington
Assistant Examiner—Monica S. Carter
(74) Attorney, Agent, or Firm—Ostrolenk, Faber, Gerb & Soffen, LLP

(57) ABSTRACT

A cutter insert for a tool for the finish machining by chip removal of bore surfaces in workpieces is proposed, the cutter insert being inserted in a recess introduced into the peripheral surface of the tool and being held by means of at least one clamping shoe which interacts by means of a clamping lip with at least one clamping surface of the cutter insert, which is distinguished by the fact that the cutter insert, which preferably has a substantially rectangular configuration, has a hypothetical center line (39) with which the clamping surface (21; 21') encloses an acute angle (α; α').

13 Claims, 5 Drawing Sheets

TOOL FOR FINE MACHINING BORING SURFACES

DESCRIPTION

The invention relates to a cutter insert for a tool for the finish machining, by chip removal, of bore surfaces in workpieces as described in the preamble to claim 1 and relates to a tool as described in the preamble to claim 9. The invention also relates to a cutter insert for a tool for the chip-removal machining of bore surfaces as described in the preamble to claim 10 and as described in the preamble to claim 16 and a tool as described in the preamble to claim 17.

Cutter inserts and tools of the type discussed here are known. The cutter insert(s) are held in the basic body of the tool with the aid of at least one clamping shoe, a clamping lip of the clamping shoe interacting with a clamping surface which is preferably arranged on the so-called cutter face, i.e. on the front surface of the cutter insert. It has been found that, particularly in the case of high machining speeds of 6000 rpm and more, secure retention of the cutter insert can no longer be ensured. This leads to people and machines in the vicinity being endangered because a cutter insert which is released can lead to injury and/or damage.

It is therefore the object of the invention to create a cutter insert which can be securely fastened in an associated tool.

To achieve this object, a cutter insert is proposed which has the features quoted in claim 1. The cutter insert is distinguished by the fact that it has a substantially rectangular configuration and that the clamping surface encloses an acute angle with the hypothetical center line of the cutter insert. Because of this configuration, an oblique clamping surface occurs which leads to secure retention of the cutter insert in the tool.

An embodiment of the cutter insert is preferred which is characterized in that the cutter insert is configured as a reversible insert and has two clamping surfaces of preferably identical configuration. Such a cutter insert is characterized in that it can be rotated, in the case of wear of one cutting edge, by 180° about an axis which is at right angles to the center line so that a further cutting edge is available for the finish machining of bore surfaces.

Further embodiments follow from the other sub-claims.

In order to achieve the object, a tool with the features of claim 9 is, in addition, proposed. It is distinguished by a high level of functional safety.

In order to achieve this object, a cutter insert with the features of claim 10 is also proposed. The cutter insert is characterized in that the clamping surface of the cutter insert is directed in such a way that, when it is firmly clamped by means of the clamping shoe, the cutter insert permits the generation of clamping forces of which one component acts against the centrifugal force and guarantees secure retention of the cutter insert in the basic body of the tool.

An embodiment example of the cutter insert is preferred which is characterized in that the clamping surface is arranged so as to be inclined in two directions relative to a hypothetical central plane of the cutter insert. On the one hand, this special arrangement of the clamping surface ensures build-up of the usual clamping forces, which anchor the cutter insert in the basic body of the tool and press it against an abutment which absorbs the cutting forces occurring during the machining of bore surfaces. On the other hand, the inclination of the clamping surface in the second direction ensures that—as stated—clamping forces are built up which force the cutter insert in the direction of the axis of rotation of the tool and therefore act against the centrifugal forces. In this way, it is possible to ensure—without particular design complexity—that the cutter insert is secured against displacement even at high rotational speeds.

Particularly preferred is an embodiment example of the cutter insert which is characterized in that the cutter insert is configured as a reversible insert in which the clamping surface has two clamping surface regions which are arranged so as to be inclined in two directions relative to the hypothetical central plane of the cutter insert. The two clamping surface regions intersect in an intersection line which encloses an angle with a hypothetical center line of the cutter insert. Even in the case of a rotation by 180° about an axis at right angles to a front surface of the cutter insert, this ensures that a cutter insert of this type is both pressed against an abutment and subjected to clamping forces which are directed in the direction toward the axis of rotation of the tool and secure the cutter insert against displacement at high centrifugal forces.

Further embodiments follow from the other sub-claims.

In order to achieve this object, a cutter insert with the features of claim 16 is also proposed which is characterized in that the clamping surface is arranged in the region of a narrow side of the cutter insert. This clamping surface interacts with an abutment which is inclined in such a way that, when the cutter insert is firmly clamped, clamping forces are built up which oppose the centrifugal force and securely retain the cutter insert even at high rotational speeds.

In order to achieve the object, a tool is also proposed which has the features quoted in claim 17.

The invention is explained in more detail below using the drawing. In this:

The cutter insert described below is used particularly for the finish machining of bore surfaces. It should, however, be expressly noted that this cutter insert can be generally employed in chip-removal tools which are introduced in bores during the machining of workpieces rotating at high speed in order to machine the associated bore surfaces.

Figure 1:
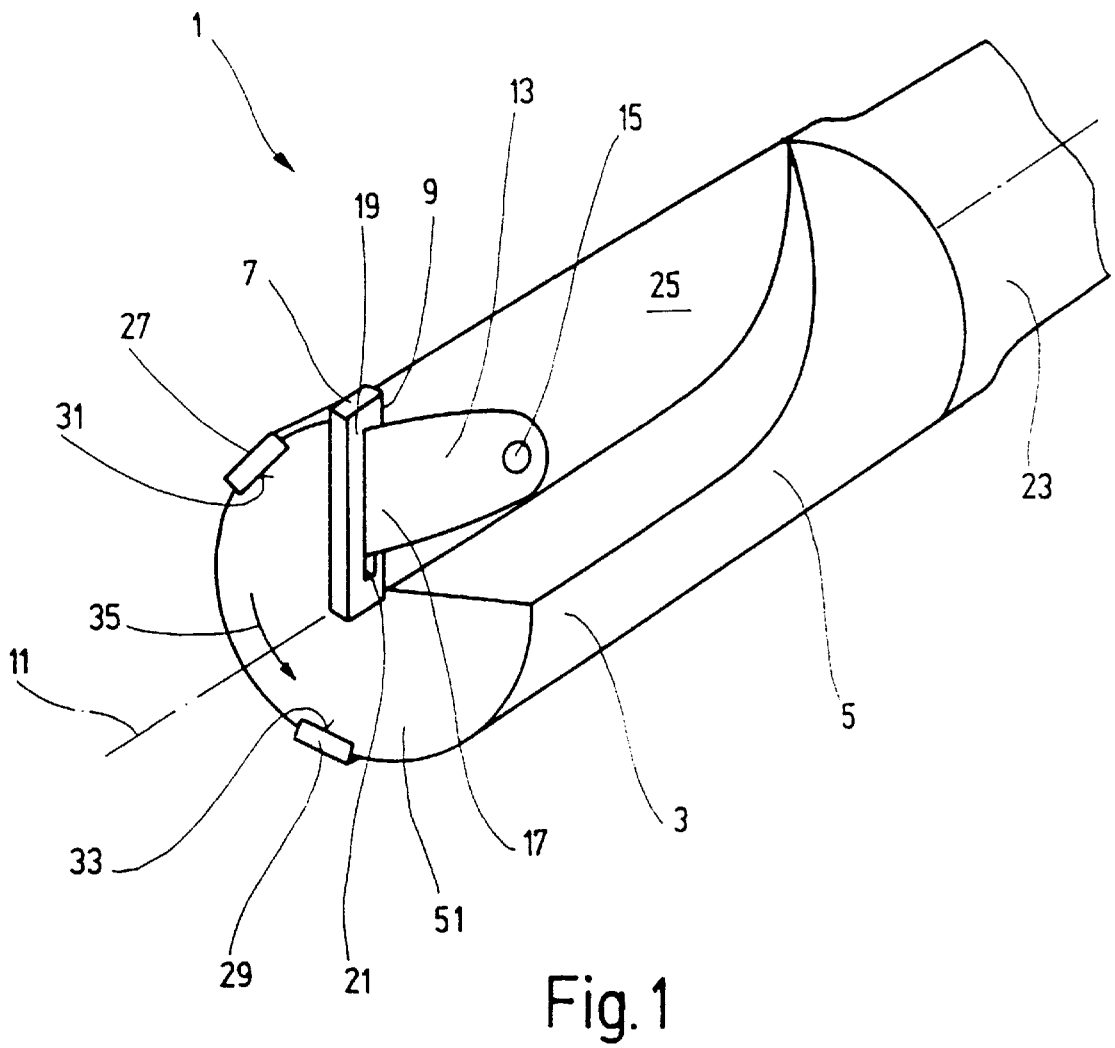
FIG. 1 shows a perspective view of a tool with a cutter insert.

The tool 1 shown in FIG. 1 is used for the finish machining of a bore surface in a workpiece. In operation, it is put into rotation and introduced into the bore to be machined.

The tool 1 has a basic body 3 in whose peripheral surface 5 at least one cutter insert 7 is inserted. For this purpose, a groove 9 accommodating the cutter insert is introduced into the peripheral surface 5 and this groove 9 extends at right angles to the axis of rotation 11 of the tool 1. The cutter insert 7 is retained by a clamping shoe 13 which is fastened in the basic body 3 of the tool 1 by means of a clamping screw 15, which is here only indicated. From the sketch shown in FIG. 1, which illustrates the principle, it may be seen that the clamping shoe 13 acts by means of a clamping lip 17 on the front surface or cutter face 19 of the cutter insert 7. The clamping lip 17 is in contact with a clamping surface 21 which is introduced into the cutter face 19.

The basic body 3 of the tool 1 has the configuration of a circular cylinder and is connected to a drive or to a machining tool (not shown here) by means of a shaft 23 (here shown truncated).

A recess or flat, which forms a chip-removal space 25, is introduced into the peripheral surface 5 of the basic body 3.

Shown purely as an example, provision is made in the tool shown in FIG. 1 for two guide strips 27 and 29 to be introduced into the peripheral surface 5 of the basic body 3. These guide strips are configured as elongated metal strips extending substantially parallel to the axis of rotation 11 and are introduced into suitable grooves 31 and 33 and are fastened there. Viewed in the direction of rotation indicated by an arrow 35, the first guide strip 27 runs behind (lags) the cutter insert 7 by approximately 40° whereas the second guide strip 29 is arranged to be diametrically opposite the cutter insert 7.

From the sketch in FIG. 1 showing the principle, it may be seen that the leading edge of the clamping lip 17 does not extend exactly at right angles to the axis of rotation 11 but extends more or less in the direction of the diagonal of the cutter insert 7, which here has a rectangular configuration. The essential point is that the leading edge of the clamping lip 17 encloses an acute angle with a hypothetical straight line at right angles to the axis of rotation 11 or with one parallel to it.

Figure 2:
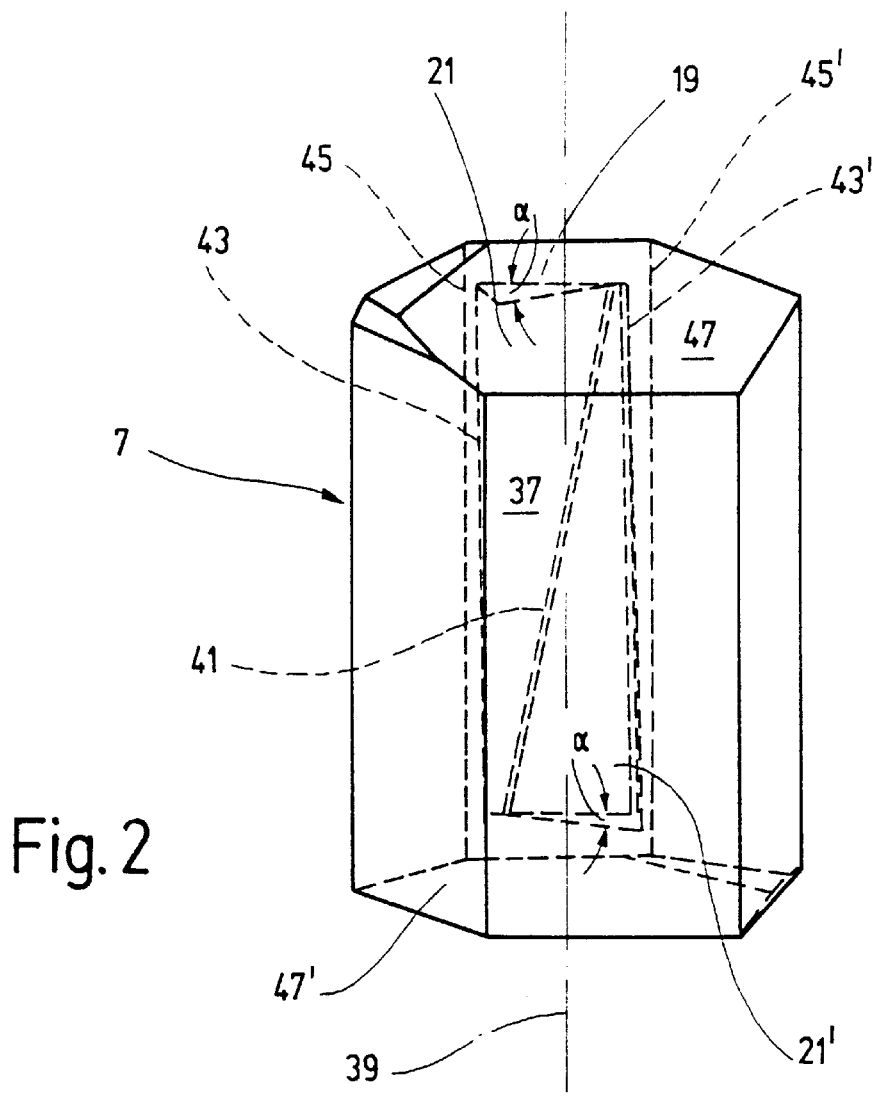
FIG. 2 shows a perspective view of a cutter insert.

FIG. 2 shows a perspective view of the cutter insert 7 to an increased scale. The rear surface 37 of the cutter insert 7 opposite to the cutter face 19 can be seen in the view. The rear surface 37 extends parallel to the cutter face 19. It may be clearly seen that two clamping surfaces 21 and 21' are introduced into the cutter face 19. A clamping lip of a clamping shoe (not shown here) comes to rest on these clamping surfaces 21 and 21' when the cutter insert 7 is clamped in the basic body of a tool. It may also be seen that, starting from the cutter face 19, the clamping surfaces fall away at an acute angle $\alpha$ relative to the plane in which the cutter face 19 is located.

FIG. 2 shows clearly that the boundary between the two clamping surfaces 21 and 21' encloses an acute angle with a hypothetical center line 39 of the cutter insert. Because the angle of inclination $\alpha$ of the clamping surface 21 has the opposite orientation to the angle of inclination $\alpha'$ of the clamping surface 21', the result is two clamping surfaces which fall away in opposite senses and are staggered relative to one another. They are separated from one another by a boundary line 41 which extends substantially diagonally over the cutter face.

FIG. 2 also shows clearly that a boundary edge 43 of the clamping surface 21 and a boundary edge 43' of the clamping surface 21' extend parallel to the center line 39 but also parallel to the surface edges 45 and 45' (here shown by interrupted lines), the surface edges here coinciding with the longitudinal edges of the cutter insert or forming these edges.

The length of the clamping surfaces 21 and 21' is somewhat less than the overall length of the cutter insert. They are arranged in such a way that they terminate at a distance from the end surfaces 47 and 47'. A clamping lip, which is in contact with a clamping surface 21 or 21', is therefore laterally protected from the penetration of chips or other impurities.

The clamping surfaces 21 and 21' have—viewed in a view onto the cutter face 19—a substantially triangular configuration. They form a right-angled triangle and their hypotenuse approximately coincides with the boundary line 41 and the longer leg of the right-angled triangle forms the boundary edge 43 or 43'. The shorter leg of the right-angled triangle extends parallel to the end surfaces 47. The inclination of the clamping surfaces 21 and 21' is selected in such a way that the deepest part of the clamping surface, viewed in the direction of the center line 39, is arranged to be close to the end surface 47 or 47'.

Figure 3:
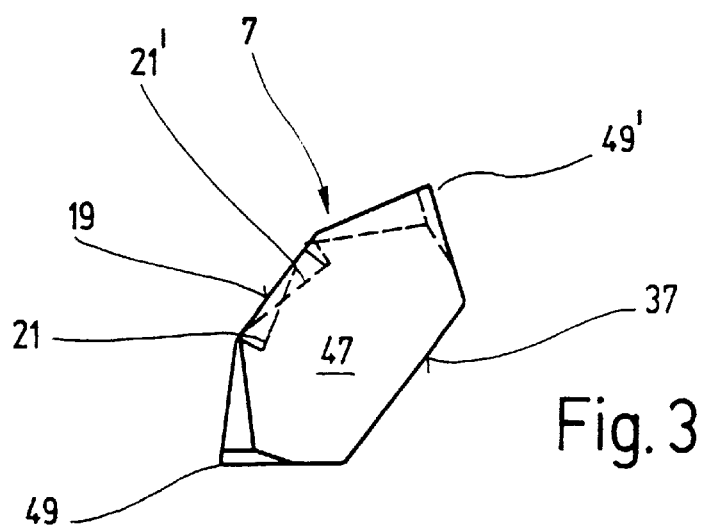
FIG. 3 shows a view onto the end surface of a cutter insert.

FIG. 3 shows a view onto the end surface 47 of the cutter insert 7. From this, it may be seen that the cutter face 19 and the rear surface 37 extend parallel to one another and that the side surfaces of the cutter insert following on from the cutter face 19 and the rear surface form the cutting edges 49 and 49' of the cutter insert. Cutter inserts of the type discussed here are fundamentally known so that they do not have to be considered in any more detail here.

The representation in FIG. 3 shows that the clamping surfaces 21 and 21' fall away at the same angle relative to the plane in which the cutter face 19 is located but that the clamping surfaces fall away in opposite directions relative to one another. For this reason, these clamping surfaces are referred to as being staggered relative to one another.

As far as the function of the clamping surfaces 21 and 21' is concerned, it is in the end unimportant whether these extend as far as the end surfaces 47, 47' of the cutter insert 7 or not. For reasons of protection from dirt, however, it is preferable that the length of the clamping surfaces should be chosen to be shorter than the overall length of the cutter insert.

The special arrangement of the cutter insert 7 and of its clamping surfaces 21 and 21' will be considered again in more detail in association with FIG. 1:

The cutter insert 7, configured here as a reversible plate as an example, is arranged—as has been stated—in a groove 9 whose length is matched to the length of the cutter insert. The end surface of the cutter insert facing away from the front surface 51 of the tool 1 is therefore located at the bottom of the groove 9. At the same time, the end surface of the cutter insert facing toward the axis of rotation 11 is located at the end of the groove. Because the clamping surface 21 or 21' extends at an angle to the hypothetical center line 39, the cutter insert is pressed —in the manner of a wedge mechanism and due to the clamping effect of the clamping lip 17 or the clamping shoe 13—against the radially inner end of the groove 9, on the one hand, and against the bottom of the groove facing away from the end surface 51, on the other.

From what is stated here, it is immediately clear that, on the basis of this double effect of the clamping shoe, the cutter insert 7 is retained particularly securely in the basic body 3 of the tool 1. This is, furthermore, also the case when the hypothetical center line 39 of the cutter insert 7 in a tool 1 extends parallel to the axis of rotation 11 and the cutter insert is subjected to forces directed outward at right angles to the axis of rotation 11 at a high rotational speed of the tool. It may, therefore, be seen that the clamping surfaces of the cutter insert are always arranged at an angle to the centrifugal forces acting at right angles to the axis of rotation even in the case of an arrangement of the cutter insert in the basic body 3 of the tool 1 which is displaced by 90°. There is, therefore, secure retention of the cutter insert 7 in the groove 9.

It may be readily seen that the fact that the clamping surface extends obliquely to the axis of rotation 11 is decisive for the secure clamping of the cutter insert 7 in the basic body 3 of a tool 1 so as to avoid accidental release of the cutter insert at high rotational speeds of the tool 1.

The secure clamping of the cutter insert in a tool does not, in the end, depend on the basic shape of the cutter insert and on the number of the clamping surfaces. Cutter inserts other than rectangular reversible inserts—for example hexagonal inserts—can therefore also be employed provided the basic idea of the oblique arrangement of the clamping surfaces relative to the axis of rotation 11 is preserved. It is therefore also obviously possible to introduce more than one cutter insert into the basic body of a tool and, by this means, to provide an orientation of the cutter insert in which the hypothetical center line 39 thereof extends substantially parallel to the axis of rotation 11 or substantially at right angles to the latter. In both assembly positions, this ensures that unintentional release of the cutter insert is avoided with a high degree of reliability because of the clamping surface which extends at an angle to the axis of rotation 11. Attention is again expressly drawn to the fact that cutter inserts with only one clamping surface do exhibit the same advantages as reversible inserts with two clamping surfaces.

The cutter insert described here is preferably manufactured by a sintering process. It is, however, also possible to generate the clamping surfaces present in the cutter face by an erosion process.

Figure 4:
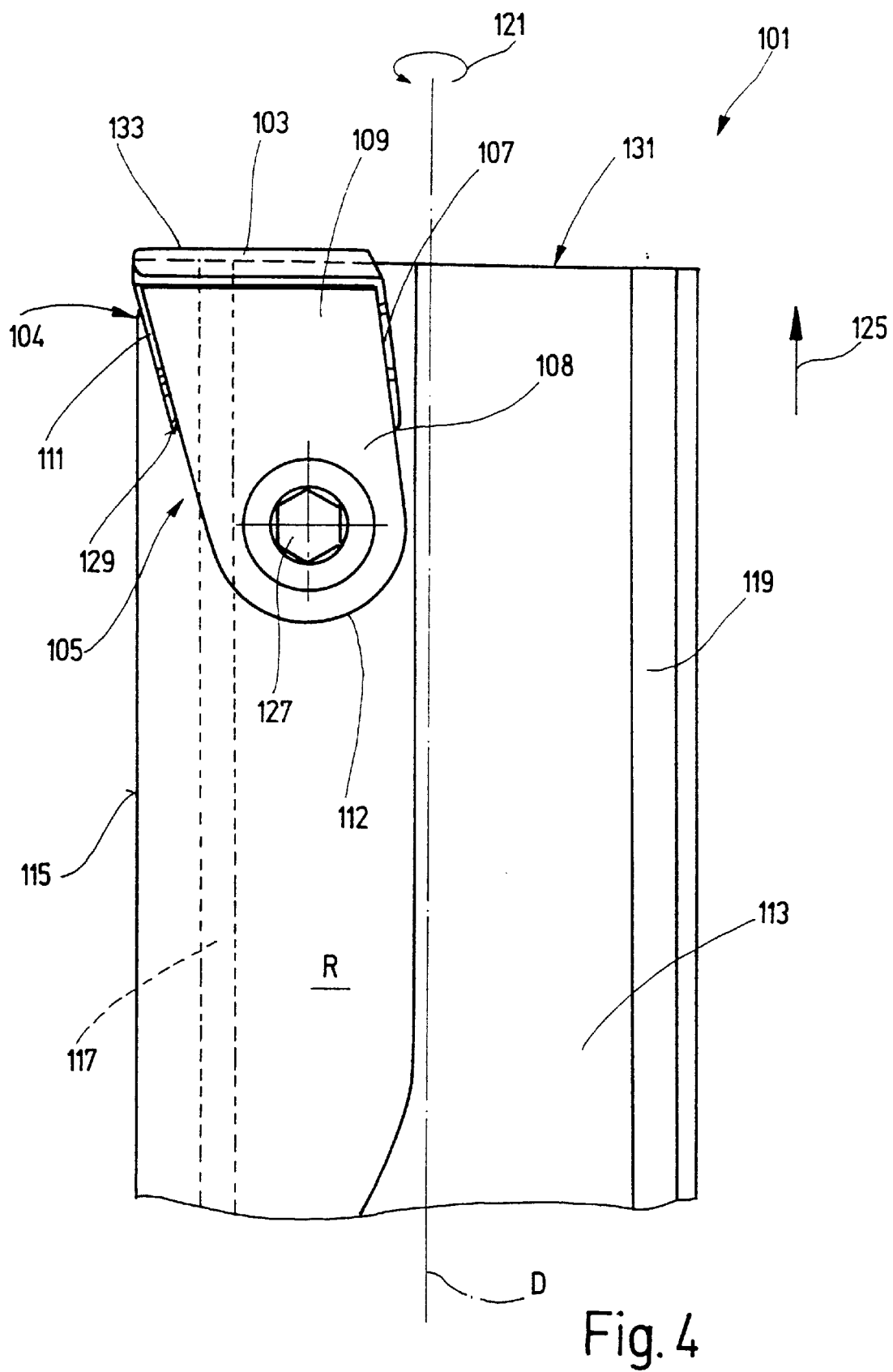
FIG. 4 shows a side view of a tool, shown as excerpt.

FIG. 4 shows an excerpt from a cylindrical tool 101, namely the front part of a tool 101, in which a cutter insert 103 is here inserted in such a way that its longitudinal edges extend horizontally and, therefore, substantially at right angles to an axis of rotation D of the tool 101 which coincides with the center line. The cutter insert 103 is arranged in a groove 104 introduced into the tool 103, which groove 104—or its longitudinal axis—extends in the radial direction relative to the axis of rotation D of the tool 101. It is retained by a clamping shoe 105 which is in contact with the front surface or cutter face 107 of the cutter insert 103 by means of a clamping lip 109. The cutter insert 103 has a clamping surface 111 which interacts with the clamping lip 109. The surface 108 of the clamping shoe 105 facing away from the cutter face 107 preferably finishes level with a boundary surface of a chip space R. For this purpose, the clamping shoe 105 is arranged to be let into a recess 112 introduced into the tool 101, the contours of which recess 112 being matched to the external shape of the clamping shoe 105 in such a way that the clamping shoe is retained in the tool 101 as a form fit.

The cutter insert 103 is inserted in the basic body 113 of the tool 101 in such a way that it protrudes beyond the radial peripheral surface 115.

Two guide strips 117 and 119 are here inserted in the peripheral surface 115 and of these, the first guide strip 117 runs behind (lags) the cutter insert 103 by approximately 40°—viewed in the direction of rotation of the tool 101 indicated by an arrow 121. The second guide strip 119 is inserted in the peripheral surface 115 diametrically opposite to the cutter insert 103.

The basic structure of a reamer or of the tool 101 is known so that it will not be considered in more detail here. With regard to the function of the tool 101, the following is here recorded. The tool is inserted in a suitable retention feature, for example in a tool spindle, and is put into rotation at high rotational speed. It is then inserted in a bore whose surface has to be machined. The bore surface is machined by the tool 101, or by the cutter insert 103 protruding beyond the peripheral surface 115, by the removal of chips. The tool 101 is supported on the bore surface by means of the guide strips 117 and 119, the guide strips then also sliding on the surface. The chips removed by the cutter insert 103 are removed via the chip space R which is formed by a recess in the peripheral surface 115. The chips can also be removed by a cooling and lubricating agent. The feed motion of the tool 101 is indicated by a double arrow 125.

The cutter insert 103 is securely retained in the basic body 113 of the tool 101 by the clamping shoe 105. A clamping screw 127 is inserted to anchor the clamping shoe 105. It is also possible to use a plurality of clamping shoes, in particular where the length of the cutter insert, measured in the radial direction, is larger.

The retention forces necessary to anchor the cutter insert 103 are generated in that the rear surface, opposite to the cutter face 107, of the cutter insert 103 is pressed against a contact surface of the tool 101, so that frictional forces act. The cutting forces acting during the machining of a bore surface are taken up by an abutment 129 with which the side edge of the cutter insert 103 facing away from an end surface 131 of the tool 101 is in contact. The leading side edge 133, viewed in the feed direction, forms the active cutting edge of the cutter insert 103. The active cutting edge protrudes beyond the end surface 131 so that it can machine the bottom surface of blind holes.

The centrifugal forces arising at high rotational speeds and which could lead to loosening of the cutter insert 103 are dealt with in that the clamping surface 111 is directed in such a way that, when the cutter insert 103 is firmly clamped by means of the clamping shoe 105, clamping forces are built up of which one component acts against the centrifugal force, i.e. at right angles to the axis of rotation D, so that the cutter insert 103 is forced in the direction toward the axis of rotation D.

FIG. 4 shows a tool 101 with a cutter insert 103 which is configured as a reversible insert.

Figure 5:
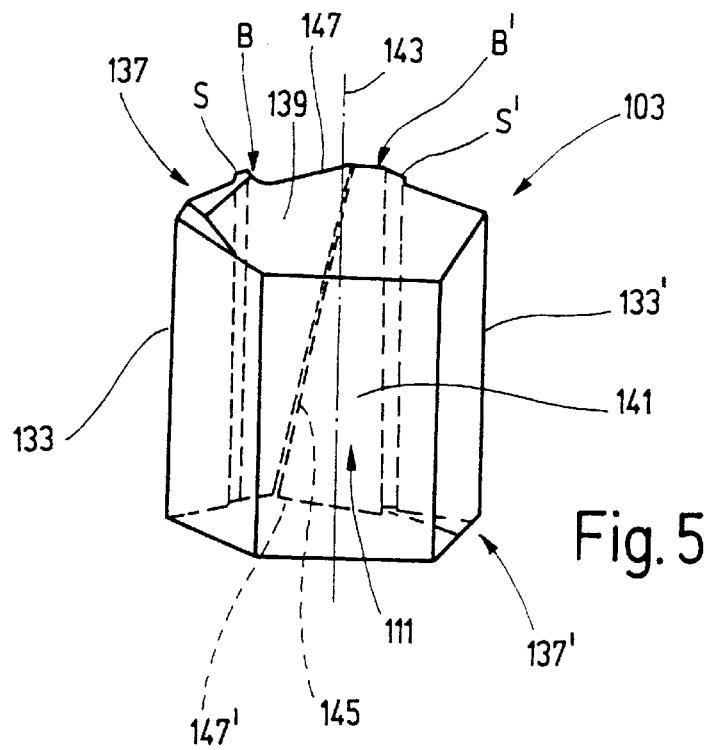
FIG. 5 shows a first embodiment example of a cutter insert of the tool shown in FIG. 4.
Figure 8:
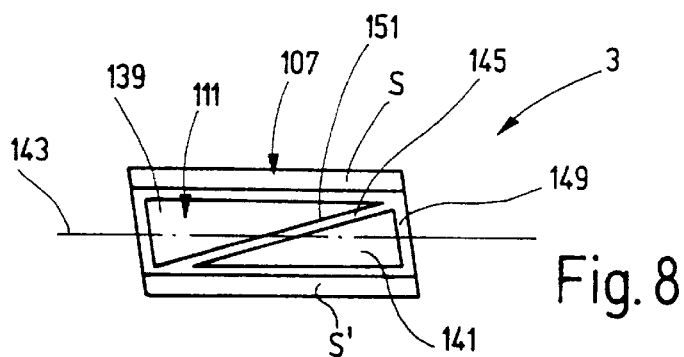
FIGS. 8 and 9 show further embodiment examples of the cutter insert.
Figure 9:
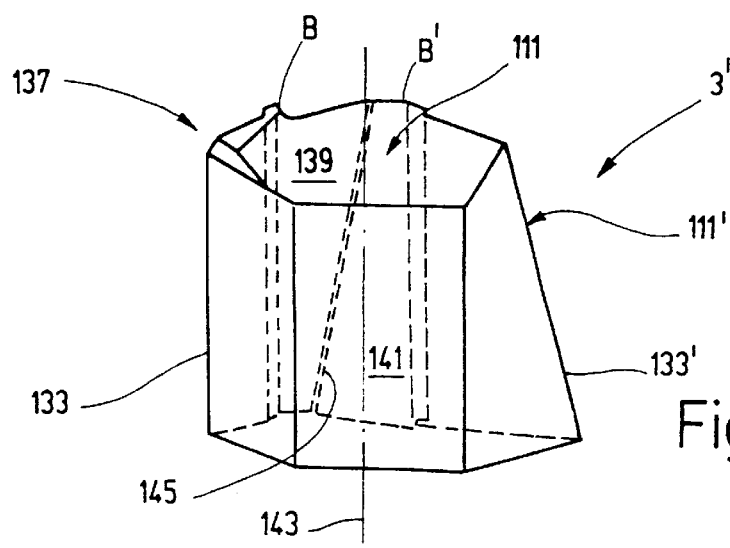

Various embodiment possibilities of the tool or of the cutter insert are shown in FIGS. 5, 8 and 9.

FIG. 5 shows, in perspective representation, a cutter insert 103 such as is inserted in the tool 101 in FIG. 4 and which is configured as a reversible insert. In the representation shown in FIG. 5, it is assumed that in the case of the cutter insert 103, which is preferably configured as a straight prism with a substantially hexagonal base surface, the active cutting edge 137 is top left, which cutting edge 137 has a main cutting edge and an auxiliary cutting edge, as is likewise the case in conventional tools. It is not therefore considered in any more detail here.

The clamping surface 111 can be seen here in the region of the cutter face 107—which is facing away from the observer in FIG. 5. The clamping surface 111 has two clamping surface regions 139 and 141.

It is known art to equip cutter inserts with two clamping surface regions, namely when the cutter insert is configured as a reversible insert. In these known cutter inserts, the clamping surface is configured as a V-shaped groove, the two clamping surface regions extending parallel to the longitudinal or side edges each falling away, viewed from the side edges, toward the hypothetical center line of the cutter insert so that, in this case, the intersection line of the two clamping surface regions is the deepest region of the clamping surface. In addition, the intersection line extends parallel to the center line of the cutter insert. In the known cutter inserts, therefore, the clamping surface regions intersect in an intersection line which extends parallel to the center line.

In the tool 101 or the cutter insert 103 shown here, the intersection line 145—which is formed by the two mutually intersecting clamping surface regions 139 and 141—extends at an angle to the center line 143. The intersection line 145 here extends diagonally through the clamping surface 111.

The cutter insert 103 shown here is characterized in that two clamping surface regions 139 and 141 are provided in the region of the clamping surface 111. These clamping surface regions 139 and 141 intersect in the region of the intersection line 145 which forms the highest region of the clamping surface 111. The clamping surfaces 139, 141 fall away from the intersection line in the direction toward the side edges 133, 133'. In addition, the clamping surface region 139—in FIG. 5—falls away from the bottom toward the top whereas the clamping surface region 141 is inclined in the opposite sense and—in FIG. 5—falls away from the top toward the bottom. In other words, the clamping surface regions 139 and 141 are additionally inclined laterally. The left-hand clamping surface region 139 falls away from the intersection line 145 to the upper outer edge 147. Correspondingly, the right-hand clamping surface region 141 in FIG. 5 falls away, starting from the intersection line 145, toward the lower outer edge 147'.

If a central plane of the cutter insert 103 extending parallel to the plane of the diagram of the representation in FIG. 5 is considered, the clamping surface regions 139 and 141 fall away relative to this central plane in two directions or they are inclined in two directions relative to the central plane. They therefore rise, on the one hand, toward the hypothetical center line 143 or toward the intersection line 145 and, on the other hand, the left-hand clamping surface region 139 falls away from the bottom toward the top whereas the right-hand clamping surface region 141 falls away from the top toward the bottom. This means that—viewed in plan view—the depth of the clamping surface regions 139 and 141—viewed in the longitudinal extent of the cutter insert 103—changes.

If the clamping lip 109 of a clamping shoe 105 now engages on the left-hand clamping surface region 139 of the clamping surface 111, a force component arises which acts in the direction of the side edge 133', by means of which the cutter insert 103 is in contact with the abutment 129, as is shown in FIG. 4. The cutter insert 103 is therefore pressed against the abutment 129. At the same time, a force component which acts downward—in FIG. 5—occurs because the clamping surface region 139 falls away from the intersection line 145 toward the outer edge 147. In the representation of FIG. 4, this force component acts in the direction of the axis of rotation D and ensures that the cutter insert 103 is not displaced radially outward even in the case of high rotational speeds.

The left-hand—in FIG. 5—clamping surface region 139 widens—viewed from the side edge 133—toward the intersection line 145 and the right-hand clamping surface region 141 becomes correspondingly narrower—viewed from the side edge 133'—in the direction toward the intersection line 145. It is clear that the clamping surface does not extend to the side edges 133 or 133'. Chip surfaces S and S' follow directly from the side edges and chips removed from the cutting edges 137 and 137' slide along these chip surfaces S and S'.

In the embodiment example shown here, a narrow horizontal strip, which separates the clamping surface regions 139 and 141, is provided in the region of the intersection line 145. It is also possible to provide such strips in the region of each of the left-hand and right-hand boundary edges B and B', the surface of these strips extending parallel or inclined to the plane of the diagram of FIG. 5 or to a hypothetical central plane of the cutter insert 103.

Figure 6:
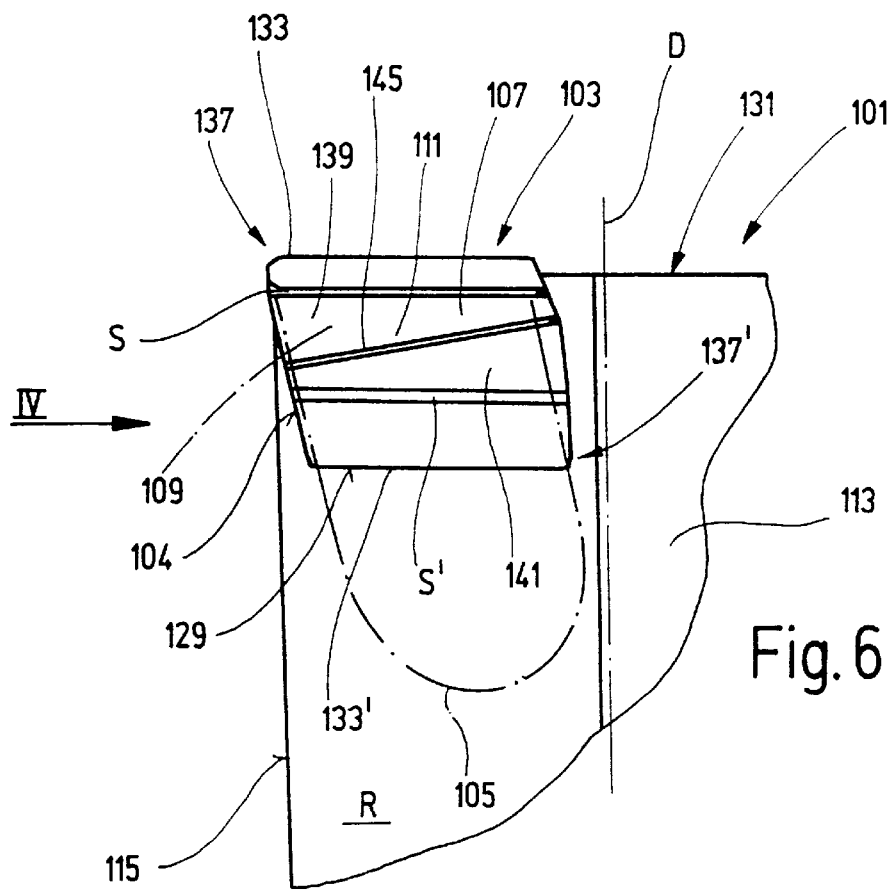
FIG. 6 shows a partial representation of the tool shown in FIG. 4.

The tool 101 reproduced in FIG. 4 is represented as an excerpt in FIG. 6, the guide strips 117 and 119 not being shown to improve comprehension. Otherwise, the same parts as those in FIG. 4 are provided with the same reference designations, to this extent reference is made to their Ad description. In addition, the clamping shoe 105 is only represented by a chain-dotted line, the clamping screw 127 being omitted. In FIG. 6 it is clear that the cutter insert 103 is introduced into the basic body 113 in such a way that its cutting edge 137 protrudes beyond the radially extending peripheral surface 115. The clamping surface 111 faces toward the observer—in contrast to the representation of FIG. 5. The clamping surface regions 139 and 141 are therefore facing toward the clamping shoe 105, the clamping lip 109 of the clamping shoe 105 only subjecting the clamping surface region 139 to a force. Because the clamping surface region 139—in FIG. 6—falls away from right to left, a force component which—in FIG. 6—forces the cutter insert 103 in the direction toward the axis of rotation D, i.e. radially inward, occurs due to the application of force by the clamping shoe or clamping lip.

It may readily be seen from FIG. 6 that in the case of a rotation of the cutter insert 103, the surface of a bore can be machined by the active cutting edge 137'. The clamping surface region 141 is—in the position of the cutter insert 103 shown in FIG. 6—not touched by the clamping shoe 105.

Figure 7:
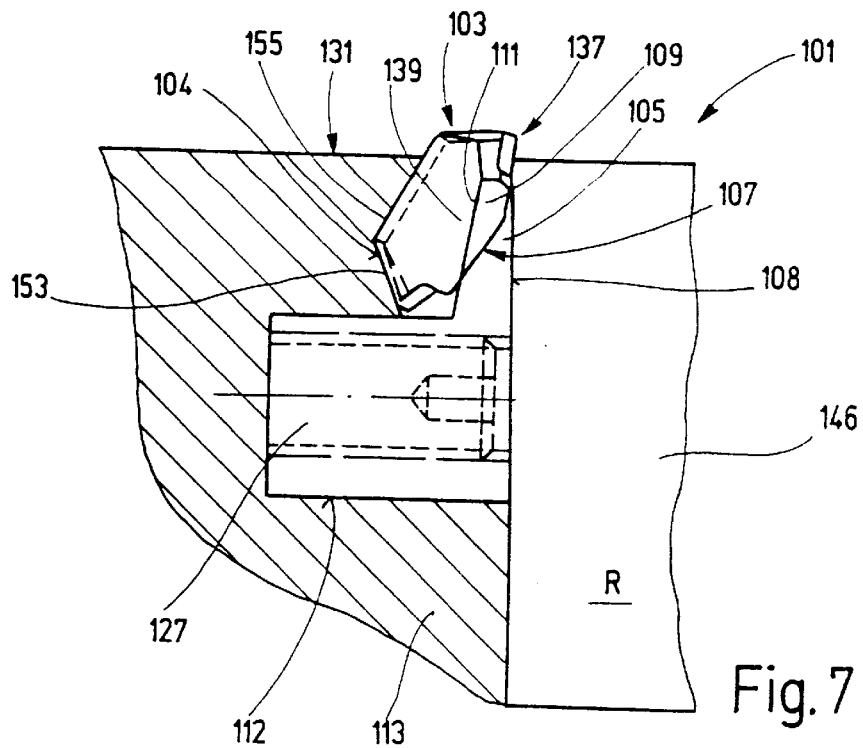
FIG. 7 shows the cutter insert held by a clamping shoe.

The tool 101 is shown as excerpt—viewed in the direction of the arrow IV in FIG. 6—in FIG. 7. The basic body 113 of the tool 101 is shown sectioned. Otherwise, the same parts as those in FIG. 4 to 6 are provided with the same reference designations so that reference can be made to their description.

FIG. 7 shows the clamping shoe 105 which is arranged in the recess 112 of the basic body 113 in such a way that its surface 108 coincides with a surface 146 of the chip space R. The clamping shoe 105, which exerts a force on the cutter insert 103, is anchored in the basic body 113 of the tool 101 by the clamping screw 127, the threaded hole in the basic body 113 not being shown. The clamping lip 109 of the clamping shoe 105 is configured in such a way that its surface facing toward the clamping surface 111 of the cutter insert 103 fits into the contour of the clamping surface region 139 or 141. Also shown is the groove 104 which accommodates the cutter insert 103. The groove 104 is configured in such a way that it accommodates the cutter insert 103, which is essentially configured as a straight prism with a substantially hexagonal base surface (FIG. 5). This means that the groove 104 represents an abutment for lateral boundary surfaces 153 and 155 of the cutter insert 103.

FIG. 8 shows a modified embodiment example of a tool 101 or a cutter face 107, here shown diagrammatically, of a cutter insert 103 which is characterized in that the clamping surface 111 is surrounded on all sides by a boundary surface 149 which extends substantially parallel to the plane of representation in FIG. 8. Here again, the clamping surface regions 139 and 141 are separated by the intersection line 145 which here likewise forms a flat strip 151. In the embodiment example shown here, the boundary surfaces 149 and the strip 151 are arranged in one plane.

The essential feature is that the clamping surface regions 139 and 141 are closed off on all sides so that a clamping lip 109 of a clamping shoe 105 is in contact in a protecting manner on the clamping surface regions and chips cannot pass under the clamping lip 109. By this means, the cutter insert 103 has a secure retention.

Otherwise, the same parts as the cutter insert represented in FIG. 6, which agree with those in the other FIGS. 4 to 7 are provided with the same reference designations so that, to this extent, reference is made to their description.

The cutter insert 103' shown in FIG. 9 is modified to the extent that one clamping surface 111' is provided which extends at an acute angle relative to the hypothetical center line 143 of the cutter insert 103', the distance between the right-hand side edge 133' and the center line 143 increasing from top to bottom. In the case of such a cutter insert 103, the abutment 129 (FIG. 4) is correspondingly inclined. This leads to the fact that when the cutter insert 103' is firmly clamped by means of a clamping shoe 105, clamping forces are built up on the basis of the configuration of the clamping surface 111' alone, which clamping forces have at least one force component which acts from top to bottom in FIG. 9 and force the cutter insert 103' toward the axis of rotation D of the tool 101. The clamping surface 111' is therefore configured in such a way that a force component acts against the centrifugal force.

In the cutter insert 103' of FIG. 9, a clamping shoe 105 likewise engages on the clamping surface 111. Starting from the left-hand boundary edge B of the clamping surface, the clamping surface can increase as far as the right-hand boundary edge B' of the clamping surface 111. It is, however, also conceivable to configure the cutter insert 103' as a parallelogram and to use it as a reversible insert, the left-hand side edge 133 extending in each case at an angle to the center line 143 so that, when the cutter insert is firmly clamped, force components occur which force the cutter insert in the direction toward the axis of rotation D of the tool 101. This means that the side edge 133 of the cutter insert 103' extends at an acute angle relative to the hypothetical center line 143, the distance between the left-hand side edge 133 and the center line 143 increasing from bottom to top. In such a case, i.e. if the cutter insert is configured as a parallelogram, the clamping surface 111 can again have two clamping surface regions 139 and 141, as is indicated by an interrupted intersection line 145.

In such a case, therefore, there are then two clamping surfaces which, when the cutter insert 103' is firmly clamped, permit the occurrence of force components which act against the centrifugal force. It may therefore be seen that a cutter insert 103' with the external contours and a clamping surface 111' represented in FIG. 9 can be additionally provided with a clamping surface 111, as has been described in detail above.

Even if the cutter insert 103 is not configured as a reversible insert, it is not only possible to configure the clamping surface 111 so that it rises from the left-hand side edge 133 or from the left-hand boundary edge B toward the right-hand side edge 133' or toward the right-hand boundary edge B' but it is also possible to provide it with an inclination so that the clamping surface 111 falls away from the right to the left. In this case also, therefore, the clamping surface 111 is inclined in two directions relative to a hypothetical central plane of the cutter insert 103' extending parallel to the plane of representation in FIG. 9 so that, when a clamping lip 109 acts on the clamping surface 111, at least one force component occurs which acts against the centrifugal force. In addition, at least one force component, which acts against the centrifugal force, arises under the action of the clamping forces built up by the clamping shoe 105 in the region of the clamping surface 111'. Such a configuration of a cutter insert as is shown in FIG. 9 can therefore, in the case of a doubly inclined clamping surface 111, offer a particularly high level of safety against displacement of the cutter insert 103' within a tool 101 at high rotational speeds.

What is claimed is:

1. A cutter insert for a tool for the finish machining by chip removal of bore surfaces in workpieces, the cutter insert comprising:
   at least one obliquely falling clamping surface which is inclined about a longitudinal axis of the cutter insert and also about a transverse axis of the cutter insert, wherein the clamping surface, the clamping surface having a substantially triangular configuration including a boundary edge which extends substantially parallel to the longitudinal axis and to a side edge of the cutter insert.

2. The cutter insert as claimed in claim 1, wherein the cutter insert is configured as a reversible insert and has two clamping surfaces.

3. The cutter insert as claimed in claim 1, wherein the length of the clamping surface is smaller than that of the cutter insert.

4. The cutter insert as claimed in claim 1, wherein the cutter insert includes first and second end surfaces which are transverse to the longitudinal axis and the clamping surface is substantially centered on a cutter face extending between the first and second end surfaces.

5. The cutter insert as claimed in claim 1, wherein the clamping surface extends at an acute angle to the axis of rotation of the tool.

6. A tool for the finish machining by chip removal of bore surfaces in workpieces, which comprises at least one cutter insert as claimed in claim 1.

7. A cutter insert for a tool for the finish machining by chip removal of bore surfaces in workpieces, the cutter insert comprising:
   a cutter face; and
   at least one obliquely falling clamping surface inclined below a plane of the cutter face about a longitudinal axis of the cutter insert and also about a transverse axis of the cutter insert.

8. The cutter insert as claimed in claim 7, wherein the cutter insert is configured as a reversible insert and the clamping surface has two opposed clamping surface regions, each clamping surface region being oppositely inclined into the cutter face about the longitudinal axis and the transverse axis, and wherein both clamping surface regions intersect at an intersection line which extends diagonally with respect to the longitudinal axis.

9. The cutter insert as claimed in claim 8, wherein the intersection line between the clamping surface regions extends approximately diagonally to the clamping surface.

10. The cutter insert as claimed in claim 7, wherein the clamping surface is surrounded by a boundary surface along at least one of the sides of the cutter insert.

11. The cutter insert as claimed in claim 7, wherein the clamping surface is provided on the cutter face of the cutter insert.

12. A cutter insert for a tool for the finish machining by chip removal of bore surfaces in workpieces, the cutter insert comprising:
    at least one obliquely falling clamping surface inclined about a longitudinal axis and about a transverse axis of the cutter insert and arranged in the region of a longitudinal side of the cutter insert.

13. A tool for the finish machining by chip removal of bore surfaces in workpieces which comprises at least one cutter insert as claimed in claim 7.

* * * * *